Patented July 26, 1949

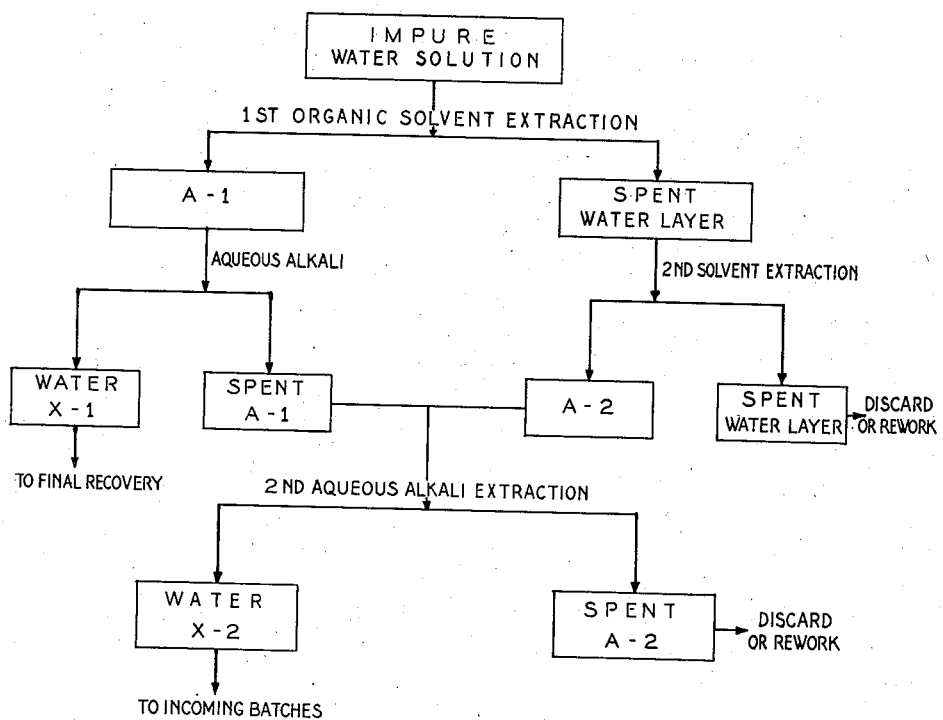

2,477,192

UNITED STATES PATENT OFFICE 2,477,192

PURIFICATION OF PENICILLIN SOLUTIONS

Graham W. McMillan, Terre Haute, Ind., assignor to Commercial Solvents Corporation, Terre Haute, Ind., a corporation of Maryland Application February 17, 1945, Serial No. 578,468

8 Claims. (Cl. 260—302)

This invention relates to a process for recovering and purifying active penicillin material. The invention is more particularly concerned with a liquid type extraction process in which a maximum potency extract is obtained and one or more extracts of successively decreasing potencies.

It has recently been discovered that when molds of the type of Penicillium notatum, Penicillium chrysogenum, and the like are propagated on certain nutrient media, they produce a material of unknown structure called penicillin, which has valuable antibacterial properties particularly useful in combating certain infections.

The amounts of penicillin produced in these processes, however, are so extremely minute, as compared to the volume of the broth or culture liquor in which it is formed, that concentration and purification of the active penicillin material to a state suitable for therapeutic use has given rise to major difficulties in recovery and purification of the active penicillin material from the culture liquor.

Therefore, in the preparation of therapeutically active penicillin material of the type produced by the propagation of the molds Penicillium notatum, etc., in nutrient media, the concentration and purification of the active penicillin factor is of prime importance, and the necessity for eventually segregating or packaging the finished penicillin material in standardized predetermined controlled potency concentrations for therapeutic administration in doses of definite, known high potencies is an essential feature.

This is especially important when the penicillin material is manufactured on a large scale and packaging is done by machines in which a standard volume of solution is transferred mechanically to each package. In this operation, it is desirable that the standard volume shall always have a predetermined potency concentration in order to supply the desired number of active penicillin units to each package.

A major difficulty in attaining this predetermined controlled high potency concentration lies in the necessity for purifying the penicillin material to the high degree necessary for therapeutic administration, and the fact that purification processes tend to form dilute solutions, particularly if maximum recovery of the penicillin factor is to be achieved at each step. Accentuating this difficulty is the fact that penicillin material in dilute solution is not readily concentrated by the usual methods of evaporation and the like to bring the potency up to the desired higher values from a lower value due to decomposition, loss of activity, contamination and the like. Accordingly, it is desirable to prepare the purified penicillin material solution initially in the predetermined desired high potency concentration or in a higher potency concentration from which it may be reduced to the predetermined lower value.

A major difficulty in the preparation of pure water concentrates from impure water solutions of penicillin material lies in the exigencies of the purification process in which the penicillin factor must successively be transferred first to an organic solvent to leave behind the water soluble non-penicillin materials, then eventually back to a water solution to rid it of organic solvent-soluble non-penicillin materials and to bring the penicillin material into proper condition for packaging and subsequent drying under the necessary specialized conditions such as, for example, high vacuum drying from the frozen state.

In the process of extraction of the impure low potency concentration water solution of penicillin material by water-immiscible organic solvents for purification as described, the penicillin material distributes itself between the two phases to some extent, never completely abandoning the water phase for the organic phase. This distribution tendency has necessitated the use in the past of comparatively large volumes of extractant to remove the major proportion of the penicillin material from the water phase and likewise in the eventual water reextraction of the organic-solvent solution of penicillin material, to transfer the penicillin factor back into water solution resulting in dilute solutions of purified penicillin material extract, which, as brought out above, it is difficult to concentrate by ordinary methods.

The requirement of high potency concentrates whose solutions can be accurately controlled to yield the desired predetermined standardized number of potency units per unit of volume is particularly urgent in the cases where high potency concentrations are to be packaged in relatively small containers, for example, where 100,000 Oxford units of penicillin activity are packaged in 20 milliliter bottles, and the like. Furthermore, it is desirable, where the packaging is to be done mechanically or by routine labor, to set up a fixed operating procedure, for example, in which the same predetermined volume of material will be fed to the final container, regardless of fluctuations in the original culture liquors or batches in which the penicillin material is formed.

It is, therefore, an object of my invention to provide a process for the controlled preparation of high potency penicillin material solutions from solutions of relatively low potency concentrations.

A further object is to provide a process for the preparation of water solutions of active penicillin material in predetermined standard potency concentrations.

Another object is to provide a process which will permit setting up of standard plant packaging procedures in which the volume and potency concentration of the product packaged is standard and substantially independent of fluctuations in the initial potency concentration of the individual batches of penicillin material.

A further object of the invention is to provide a process for substantially complete recovery of the penicillin active material in highly purified form from impure water solutions thereof.

A still further object is to provide a multistage process for recovering active penicillin material from impure solutions thereof in which a single maximum potency fraction, and one or more fractions of lesser penicillin potency are obtained.

Other objects will be apparent from the description and claims.

These objects are accomplished according to my invention in which an impure aqueous solution of penicillin material is first subjected to multiple-stage extraction with limited, controlled quantities of a water-immiscible organic solvent under conditions favoring the transfer of the penicillin material from the water to the organic solvent phase, leaving behind the major proportion of the water soluble non-penicillin impurities, thereafter reextracting the organic solvent extracts with limited, controlled quantities of aqueous extractant under conditions favoring the transfer of the penicillin material from the organic solvent phase back to the water phase to obtain the penicillin material in a highly pure state and to provide a single maximum potency extract, and one or more extracts of lesser potency concentration, and controlling the potency concentration of the maximum potency extract by controlled return of at least one of the lesser potency extracts to the system as described hereinafter.

By the term "potency concentration" as used herein, I mean the concentration of penicillin activity in terms of accepted units of antibiotic activity per milliliter of solution, for example, Oxford units of penicillin activity as measured microbiologically in terms of its ability to inhibit the growth of a specified organism.

In practicing my invention, I utilize as a starting material any impure aqueous solution of penicillin material, preferably a solution which has already been subjected to concentration and partial purification steps, and I find particularly suitable the so-called evaporated eluate material resulting from the penicillin recovery process described in copending application, Serial No. 572,431, filed January 11, 1945, in the name of Julian K. Dale, in which penicillin material is recovered from the fermentation liquor in which it has formed, by adsorption on an active carbon adsorbent, and eluted therefrom by means of aqueous mixtures of water-miscible organic solvents. According to one feature of the Dale process, the organic solvent portion of the mixture is removed by evaporation or otherwise, leaving the penicillin material concentrated in the aqueous portion of the former mixture. This aqueous residue solution is conveniently referred to as the "evaporated eluate." Such solutions vary in potency concentration, and although the higher concentration solutions can be made to yield increased quantities of extracts of high penicillin activity concentration, the lower concentration solutions also are utilizable according to my process to contribute to the production of the higher activity concentration solutions. The evaporated eluate solutions usually have a low hydrogen ion concentration, that is, they are of slightly acid to slightly alkaline character, since the penicillin material at this stage is most stable at hydrogen ion concentrations corresponding to pH values of about 5 to 8.5. At these pH values, the penicillin is soluble in water and is relatively stable under ordinary temperature conditions. At these stable pH values, however, it is virtually insoluble in the water-immiscible organic solvents used to selectively extract it and purify it of its water soluble non-penicillin impurities. It is only under conditions of relatively high acidity, i. e., low pH values, that the penicillin material is readily soluble in the water-immiscible organic solvents described. It is, of course, understood that the changes in pH values described do not effect a complete demarkation as to solubility of the penicillin material in the water or organic solvent, and the solubility of the penicillin material in the two phases follows the well known distribution law or partition law, and the penicillin material distributes itself between the two layers in a constant ratio at given conditions. Thus, while penicillin material is not entirely absent from either phase under the different conditions described, the proportion seeking the organic solvent phase under the high acidity conditions described is the major proportion, while that seeking the water phase under the subsequently imposed neutral or alkaline conditions of the reextraction process is the greatly preponderant proportion.

The accompanying flow sheet is self-explanatory and, with the following general description of my process, will facilitate an understanding of the sequence of the several steps.

Before extracting the penicillin material in accordance with my invention, the solution must be adjusted to the acidity values at which the penicillin material is soluble in the organic solvent, and insoluble in the water solutions, that is, at which the distribution ratio favors the organic solvent. Since the penicillin is unstable at high acidity values, I preferably first chill the impure water solution to a temperature sufficiently low so as to minimize the decomposition and loss of activity of the penicillin factor during the extraction stage. This temperature should be as low as possible while still avoiding freezing, and such as will result in a favorable distribution of the penicillin material to the solvent phase. These conditions appear to be most favorable at temperatures of around 10–15° C., which I have found suitable for carrying out the solvent extraction process. After chilling, I reduce the pH value of the impure water solution of penicillin material to an acid value in the neighborhood of pH 2 to 5. The penicillin material is more soluble in the organic solvent at the lower pH values, but also more unstable. Thus, while it is desirable to lower the pH as much as possible to achieve the maximum penicillin solubility in the organic solvent extractant, this low pH must be compromised with the instability factor under these conditions. I find that a pH value between about pH 2.0 to 2.75 is convenient, but higher values will give adequate extraction although not as complete as when the extraction is conducted at the lower values. Any suitable acid may be used for the purpose of adjusting the pH value, and buffer acids such as phosphoric are convenient.

After the solution has been chilled and adjusted to the desired acidity value, it is treated with a controlled, limited quantity of an organic, water-immiscible solvent in which the penicillin material is soluble under the conditions of the extraction. The volume of organic solvent extractant used will vary somewhat with the potency concentration desired in the final extract, the smaller the volume, the greater the concentration of active penicillin material in the solvent. However, the volume of solvent used, though limited by the considerations of concentration described, must be large enough to insure adequate contact between the two liquids within the limited time within which the transfer of the penicillin material is to be effected. The concentration of penicillin potency is achieved, according to the distribution law referred to, by removing the major proportion of the active penicillin material from the impure water solution at this stage. In this first extraction step, the impure water solution is agitated thoroughly with the small volume of solvent to promote such contact as will facilitate exchange of the major proportion of the penicillin material from the water to the solvent phase, the time of agitation being limited to as short a period as feasible. At this stage, it is of major importance to reduce to a minimum the time at which the active penicillin material must remain at the unstable pH condition of maximum organic solvent solubility. This limited time is of the order of minutes only, and I have found an agitation time of 5–10 minutes sufficiently long in most cases, followed by immediate separation of the two layers. The organic solvent layer now contains the major proportion of the active penicillin material, and is virtually free of water soluble impurities, the aqueous layer contains a minor proportion of penicillin activity. The partially spent water layer is again extracted as described for the first extraction, and two layers are obtained, the organic solvent layer (A—2) containing the major proportion of the active penicillin material left in the water layer by the first extraction. The first organic solvent extract (A—1) is then brought to a neutral or slightly alkaline pH value suitable for transfer of the penicillin material to the subsequent aqueous phase. This is conveniently accomplished by titration of the organic solvent extract with a water solution of an alkaline material such as a dilute sodium hydroxide, sodium carbonate, sodium bicarbonate, calcium hydroxide, etc., solution, while maintaining agitation to aid in the neutralization. This titration accomplishes the dual purpose of neutralizing the acid penicillin material and adding to it the aqueous extractant of the next step. The dilution of the alkaline solution is adjusted so as to concomitantly add the desired small volume of water to the first organic extract (A—1) and to obtain adequate contact between the aqueous solution and the organic extract for the purpose of retransferring the now purified penicillin material back to a water solution from which it can eventually be recovered in dry form as a salt such as the sodium or calcium salt. The water used to make up the alkaline solution at this stage will preferably be pyrogen-free in order to yield a material with minimum contamination for final sterilization treatment prior to therapeutic administration. The time of agitation of the alkaline solution with the organic solvent material can be somewhat longer in this case than in the case of the organic solvent extraction at the unstable pH value. In fact, it can be sufficiently long and at a sufficiently high temperature, for example, room temperature rather than the severely reduced temperatures of the organic solvent extraction, that a maximum distribution of the active penicillin material to the water phase will take place. After a sufficiently long period of contact, for example, ½ hour to 1 hour, the two layers are separated. The water layer (X—1) now contains the major portion of the penicillin activity originally present in the impure water solution starting material.

The penicillin activity or potency of this first water extract is high. The magnitude of this activity can be regulated to a certain extent by the choice of more or less limited volumes of organic solvent extractant and of aqueous alkaline extractant. But major adjustments in the final potency concentration of the primary extract are made by feeding back to the impure water solutions to be extracted, the desired amounts of the secondary water extract (X—2) as described hereinafter, to bring the potency concentration of the incoming impure water solution to the potency required to produce a final extract of the predetermined desired high potency concentration.

The concentrated extract will desirably be of the same or higher potency than the maximum potency required for the highest potency doses to be packaged, so that a conveniently small volume may contain the required high total unitage. The volume may then be adjusted by dilution so that the extract will contain the exact potency concentration desired. For example, if it is desired to use 5 milliliters of solutions for desiccation in bottles to contain a total of 100,000 Oxford units potency, the extract will be adjusted to contain 20,000 units per milliliter. It may, however, be desirable to use only 2 milliliters for the same packages, and in this case, the high potency extract will be diluted only enough to furnish 50,000 units per milliliter.

The volume of organic solvent extractant should be relatively small as compared to the volume of the original impure water solution, so as to effect a maximum concentration of the penicillin activity at this stage as well as a purification. I have found that for impure penicillin solutions containing a potency concentration of the order of 500 to 2500 Oxford units per milliliter, or more the volume of organic solvent extractant may conveniently be of the order of $\frac{1}{10}$ to $\frac{1}{5}$ of the volume of the solution treated, while the volume of the aqueous solution used to extract the respective organic solvent extracts (A—1 and A—2) may be of the order of $\frac{1}{10}$ to $\frac{1}{25}$ the volume of the solution treated. For example, according to my procedure, if a starting solution containing 1000 Oxford units per milliliter of penicillin activity is extracted with $\frac{1}{5}$ volume of organic solvent, and assuming that this volume removes 80% of the penicillin activity, the resulting extract will have an activity concentration of 4,800 units per milliliter. If this extract (A—1) is reextracted with $\frac{1}{10}$ its volume of aqueous alkaline solution, assuming removal of 90% of the penicillin activity, there is a further concentration to 40,000 units per milliliter of penicillin activity in the high potency water extract (X—1).

In accordance with the distribution law referred to, each transfer of the penicillin material from one medium to another medium leaves a small proportion of the valuable penicillin material in the original medium. In accordance with my process, the major proportion of the remaining penicillin material is also recovered from these partially spent solutions without dilution of the maximum potency extract, and in fact in such a way as to contribute an increase in its potency.

As mentioned above, the water layer from the first organic solvent extraction is extracted a second time with organic solvent, and separated into two layers, the organic solvent layer A—2 containing the major proportion of the remaining penicillin material, but much less than the first extract A—1. This second organic solvent extract is next combined with the spent organic solvent from the concentrated water extraction (spent A—1), and the combined lower concentration organic extract is reextracted with a second aqueous alkaline solution in the manner previously described. The water extract (X—2) from this operation contains a lower potency concentration of penicillin material, and may be utilized for lower potency concentration packages, but is preferably set aside to be added to fresh batches of incoming impure water solution to fortify the new batch to control the potency concentration of the succeeding maximum potency extract (X—1). This fortifying extract is particularly useful in smoothing out and to a large extent eliminating potency variations from batch to batch and larger or smaller quantities of this extract as required can be added to lower potency batches to insure a uniformly high potency concentration in the maximum potency fraction since these secondary solutions, while usually insufficiently concentrated for final drying, are usually many times more concentrated than the original impure water solutions to be purified. The remaining spent solutions may be discarded or subjected to further recovery if their potency concentrations warrant it.

The quantity of secondary water extract (X—2) returned to the succeeding impure water solution batches will be determined by a number of factors in accordance with the equation given below:

$$dm = \frac{n}{abyz} - E$$

where $dm$ is the enhancement in penicillin potency concentration required in the succeeding batch to yield the desired potency concentration in the maximum potency water extract (X—1); $n$ is the potency concentration desired in the maximum potency water extract; $a$ is the fraction conversion of penicillin in the impure water solution to penicillin in the organic solvent extract (A—1); $b$ is the fraction conversion of penicillin in the first organic solvent extract (A—1) to penicillin in the maximum potency extract (X—1); $y$ is the ratio of the volume of the incoming impure water solution of penicillin to the volume of the first organic solvent extract (A—1); $z$ is the ratio of the volume of the first organic solvent extract (A—1) to the volume of the maximum potency water extract (X—1); and $E$ is the potency concentration of penicillin in the initial impure water solution of penicillin whose potency is to be enhanced.

Thus, if the incoming impure water solution of penicillin to be recovered and purified has a potency concentration E, of 500 Oxford units of penicillin activity per milliliter of solution, and if the fractional conversion, $a$, of penicillin from the impure water solution to penicillin in the first organic solvent extract (A—1) is 0.8 and the fractional conversion, $b$, of penicillin from the A—1 organic solvent extract to the maximum potency water extract (X—1) is 0.9 and the ratio, $y$, of the volume of initial impure water solution to the first organic solvent extract (A—1) is 5, and the ratio, $z$, of the volume of A—1 to X—1 is 10, and if it is desired to prepare a maximum potency water extract (X—1) having a potency concentration, E, of 35,000 Oxford units per milliliter, then it will be necessary to add sufficient X—2 solution to the impure water solution to bring the potency concentration of the incoming batch up to about 1000 Oxford units per ml. That is, if the volume of the impure water solution to be purified is 200 gallons, and the X—2 solution has a potency concentration of 10,000 Oxford units per ml., it will be necessary to add 10 gallons of X—2 secondary extract.

My process thus permits recovery of substantially all the penicillin activity from the impure solutions processed and at the same time tends to bring about the steady production of a maximum potency extract of appreciably enhanced percentage recovery with respect to the potency concentration of the material to be processed, with a corresponding decrease in the percentage of penicillin activity going to the lower potency or fortifying extracts.

The organic solvent extractant which I use may be any water-immiscible organic solvent in which the active penicillin material is soluble under the conditions of extraction, and for this purpose, I have found such solvents as amyl acetate, methylisobutylketone, chloroform, butyl acetate, isopropyl acetate, butanol and the like, to be suitable.

As illustrative of my invention, the following specific examples are given:

*Example I*

8,300 milliliters of impure water solution of penicillin material, containing 2,730,000 Oxford units of penicillin activity, that is, 330 Oxford units per milliliter, are cooled to 10° C., and brought to a pH of 2.5 with phosphoric acid. 1400 milliliters of amyl acetate are added to the solution and the mixture is agitated for 5 minutes. Two immiscible layers form and are separated into a top layer, A—1, and a bottom, watery layer, the latter of which after separation is reagitated for 5 minutes with 1400 milliliters of fresh amyl acetate. Again two layers separate and a second upper solvent layer, A—2, is obtained. The original organic solvent extract solution, A—1, having a volume of 1300 milliliters, is agitated with 104 milliliters of 0.7% NaOH in distilled water for ½ hour. The solution forms two layers, which are separated. The bottom watery layer, X—1, has a pH of 6.95, and contains 2,230,000 Oxford units of penicillin activity, that is, 82% of the original potency and has a potency concentration of 21,400 units per milliliter.

The partially spent organic solvent top layer from this watery extraction is now mixed with solution A—2, that is, with the solvent extract solution from the second extraction. The combined organic extract mixture of A—2 and partially exhausted A—1, having a combined volume of 2,700 milliliters, is agitated with 250 milliliters of 1% NaHCO₃ in distilled water. After ½ hour, the layers which form are separated. The bottom aqueous layer is at a pH of 7.8 and is found to contain 460,000 Oxford units of penicillin activity, or 1830 units per milliliter, that is, 17% of the initial potency.

*Example II*

4620 milliliters of evaporated eluate, containing 2,030,000 units of penicillin, that is, 439 Oxford units per milliliter, is mixed with 300 milliliters of a solution of the sodium salt of penicillin to be reprocessed, and containing 2,400,000 units of penicillin, that is, 8,000 Oxford units per milliliter. The mixture is cooled to 10° C., the pH is brought to 2.7 with phosphoric acid, and the mixture is agitated for 5 minutes with 820 milliliters of amyl acetate. Two immiscible layers form and are separated into a top layer, A—1, and a bottom, watery layer, the latter of which is reagitated for five minutes with 820 cc. of fresh amyl acetate. Again two layers separate and a second upper solvent layer, A—2, is obtained. The original organic solvent extract solution, A—1, having a volume of 745 milliliters, is agitated with 75 milliliters of 1% NaOH in pyrogen-free water for ½ hour. The solution forms two layers, which are separated; the bottom watery layer, X—1, has a pH of 6.85 and contains 3,320,000 Oxford units of penicillin activity, i. e., 75% of the original potency, and has a potency concentration of 44,300 units per milliliter.

The partially spent organic solvent top layer is then mixed with solution A—2, that is, with the solvent extract solution from the second extraction. The combined organic extract mixture of A—2 and partially exhausted A—1, having a combined volume of 1620 milliliters, is agitated with 150 milliliters of 1% NaHCO₃ in distilled water. After ½ hour, the layers which form are separated. The bottom aqueous layer is at pH of 7.3 and is found to contain 1,060,000 Oxford units of penicillin or 7,000 units per milliliter, that is, 24% of the initial potency.

*Example III*

4900 milliliters of evaporated eluate containing 918,000 units of penicillin activity, i. e., 187 units per milliliter, is mixed with 850 milliliters of a solution of the sodium salt of penicillin, representing the low potency extract (X—2) of a previous extraction and containing 2,620,000 units of penicillin activity, i. e., 3,082 units per milliliter. The mixture is cooled to 10° C., the pH is brought to 2.7 with phosphoric acid and agitated for 5 minutes with 950 milliliters of amyl acetate. Two immiscible layers form and are separated into a top organic solvent layer, A—1, and bottom watery layer. The aqueous layer is reagitated for 5 minutes with 950 milliliters of fresh amyl acetate. Upon separating these two layers, the organic solvent solution A—2 is obtained. The first organic extract solution, A—1, having a volume of 850 milliliters, is now agitated for ½ hour with a mixture composed of 1 gram of Ca(OH)₂ slurried with 100 milliliters of distilled water. The separated aqueous bottom layer is at pH 5.8 and contains 1,630,000 units of penicillin, as the calcium salt, that is, 43% of the original potency, having a potency concentration of 16,200 units per milliliter. The partially spent organic solvent top layer is then mixed with the second organic solvent extract, A—2. This mixture of A—2 and partially exhausted A—1, having a combined volume of 1811 milliliters, is agitated with 180 milliliters of 1% NaHCO₃ in distilled water. After ½ hour, the layers are separated. The aqueous bottom layer is at pH of 6.9 and is found to contain 2,200,000 units of penicillin (52% of the initial potency), or a potency concentration of 12,200 units per milliliter.

Although the above describes the preferred embodiments of my invention, it is understood that departures may be made therefrom within the scope of the specification and claims.

What is claimed is:

1. A process for preparing purified, aqueous penicillin solutions of predetermined, controlled, high potency concentrations, which comprises subjecting an impure, low potency concentration aqueous solution of penicillin material to a multiple-stage extraction under acid conditions with successive volumes of a water-immiscible organic solvent in which the penicillin material is soluble, which volumes are fractional parts of the volume of the said aqueous solution, separately reextracting under alkaline conditions the respective organic solvent extracts from each extraction step, with volumes of an aqueous solution equal to fractional parts of the organic solvent extracts, to obtain a single primary maximum potency extract, combining the secondary organic solvent extract with the spent organic solvent material from the primary aqueous extraction, reextracting under alkaline conditions these combined organic solvent extracts with an aqueous solution, to obtain a secondary aqueous penicillin extract, and returning the secondary aqueous extract to successive, impure, low potency concentration water solutions to be purified, in quantities controlled according to the equation:

$$dm = \frac{n}{abyz} - E$$

where $dm$ is the enhancement in penicillin potency concentration required in the succeeding batch to yield the desired potency concentration in the maximum potency water extract; $n$ is the potency concentration desired in the maximum potency water extract; $a$ is the fractional conversion of penicillin in the impure water solution to penicillin in the organic solvent extract; $b$ is the fractional conversion of penicillin in the first organic solvent extract to penicillin in the maximum potency extract; $y$ is the ratio of the volume of the incoming impure water solution of penicillin to the volume of the first organic solvent extract; $z$ is the ratio of the volume of the first organic solvent extract to the volume of the maximum potency water extract; and E is the potency concentration of penicillin in the initial impure water solution of penicillin whose potency is to be enhanced.

2. A process for purifying penicillin material and for concomitantly controlling its potency concentration which comprises treating an impure water solution of penicillin material with a limited quantity of a water-immiscible organic solvent therefor, said quantity being between about 1/10 and 1/8 of the volume of the said impure water solution at a pH between 2 and 5 while maintaining the mass in a state of agitation, whereby the major proportion of the penicillin is transferred from the water phase to the organic solvent phase and the major proportion of the water soluble non-penicillin impurities are left in the water phase along with a minor proportion of the penicillin material, separating the organic solvent phase from the water phase, treating the solvent phase with a limited volume of water containing sufficient alkaline material to bring the resulting mixture to a neutral to slightly alkaline condition, said volume being between about $\frac{1}{10}$ and $\frac{1}{25}$ of the volume of said solvent phase while maintaining the mass in a state of agitation, whereby the penicillin material is transferred to the second water-phase, leaving substantially all the remaining non-penicillin impurities in the organic solvent phase, whereby a highly pure, highly potent penicillin material concentrate in water is obtained, further treating the water phase from the first organic solvent extraction step in a similar manner to recover an additional penicillin fraction of lower potency, and returning at least a portion of the said additional penicillin fraction to the succeeding batch of impure water solution of penicillin material to be extracted.

3. A process for purifying impure aqueous solutions of penicillin material and for concomitantly effecting substantially complete recovery of the original penicillin activity in the form of a first maximum potency aqueous extract and a second more limited potency aqueous extract which comprises subjecting said impure aqueous solution of penicillin material to a two-stage extraction at a pH between about 2 and 2.75 with a quantity of a water-immiscible organic solvent in which the penicillin material is soluble, whose volume is of the order of $\frac{1}{6}$ to $\frac{1}{10}$ the volume of the original impure aqueous solution, reextracting the respective organic solvent extracts from each extraction step with a quantity of an aqueous alkaline solution whose volume is of the order $\frac{1}{10}$ to $\frac{1}{25}$ that of the respective organic solvent extract, returning at least a portion of the second aqueous extract to a subsequent batch of impure aqueous solution of penicillin material, and repeating said extraction cycle.

4. A process of recovering an aqueous solution of penicillin having a substantially-constant high potency from impure aqueous solutions of penicillin material of variable relatively low potency recovered in successive fermentation operations, which comprises adding to such an impure aqueous solution of low potency a quantity of recycle aqueous extract recovered from a previous operation of the process, adjusting the pH of the resulting mixture to a value of from about 2 to 5, extracting the acidified mixture with a relatively smaller volume of a water-immiscible organic solvent for penicillin to recover a primary solvent extract and a partly spent aqueous layer, subjecting the latter to a second extraction with another portion of water immiscible solvent to recover a secondary solvent extract, subjecting the latter to extraction with a neutral to slightly alkaline aqueous solution of relatively smaller volume to recover a secondary aqueous extract, recycling at least a portion of said secondary aqueous extract to fortify a second batch of impure aqueous penicillin solution to be extracted in a repetition of the process, and subjecting the said primary solvent extract to extraction with an aqueous neutral to slightly alkaline solution of relatively smaller volume to recover a constant high-potency aqueous penicillin solution, the quantity of secondary aqueous extract recycled in repetitions of the process being such as to produce a substantially constant potency in the mixtures of secondary aqueous extracts and impure aqueous solutions of penicillin.

5. The process of claim 4 including the recovery from the final extraction step of a spent solvent layer and uniting said spent solvent layer with the said secondary solvent extract prior to extraction of the latter with said aqueous alkaline solution.

6. The process of claim 4 wherein the ratio of the volume of immiscible organic solvent to the aqueous solutions of penicillin employed in the solvent extraction steps is within the range of about 1:10 to 1:6.

7. The process of claim 4 wherein the ratio of the volumes of aqueous neutral to slightly alkaline solutions to the solvent solutions of penicillin employed in the aqueous extraction steps is within the range of about 1:10 to 1:25.

8. A process of recovering an aqueous solution of penicillin having a substantially-constant high potency from impure aqueous solutions of penicillin material of variable relatively low potency recovered in successive fermentation operations, which comprises adding to such an impure aqueous solution of low potency a quantity of recycle aqueous extract recovered from a previous operation of the process, adjusting the pH of the resulting mixture to a value of from about 2 to 5, extracting the acidified mixture with a water-immiscible organic solvent for penicillin to recover a primary solvent extract and a partly spent aqueous layer, the relative volumes of solvent and aqueous solution employed in the extraction step being from about 1:10 to 1:6, subjecting the spent aqueous layer to a second extraction with another portion of organic solvent to recover a secondary solvent extract, subjecting the said primary solvent extract to extraction with a neutral to slightly alkaline aqueous solution to recover a constant high-potency aqueous penicillin solution and a spent solvent layer, the relative volumes of aqueous extractant and primary solvent extract being from about 1:10 to 1:25, uniting said spent solvent layer with said secondary solvent extract, extracting the mixture with a neutral to slightly alkaline aqueous solution to recover a secondary aqueous extract and recycling a sufficient amount of the latter to a second batch of impure aqueous penicillin solution to produce a mixture of substantially constant potency to be extracted in a repetition of the process.

GRAHAM W. McMILLAN.

REFERENCES CITED

The following references are of record in the file of this patent:

UNITED STATES PATENTS

| Number | Name | Date |
|---|---|---|
| 2,399,840 | Wachtel | May 7, 1946 |
| 2,424,832 | Koerber | July 29, 1947 |

OTHER REFERENCES

Lancet II, pp. 177–189, August 16, 1941.
Abraham: British J. of Exp. Pathology, June 1942, vol. 23 pp. 103–108.
Callahan's "Penicillin" in Chemical and Met. Engineering, Apr. 1944, 10 pages.
Heyden Reports, H. I., pp. 1–5, May 9, 1944.
Pfizer Reports, p. 4, pp. 1–5.